(12) United States Patent
Imada

(10) Patent No.: US 6,470,147 B2
(45) Date of Patent: Oct. 22, 2002

(54) IMAGE BLUR CORRECTION APPARATUS AND IMAGE PICKUP APPARATUS WITH THE IMAGE BLUR CORRECTION APPARATUS

(75) Inventor: Shinji Imada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/822,336

(22) Filed: Apr. 2, 2001

(65) Prior Publication Data

US 2001/0038749 A1 Nov. 8, 2001

(30) Foreign Application Priority Data

Apr. 6, 2000 (JP) ........................................ 2000-104774
Mar. 12, 2001 (JP) ........................................ 2001-068676

(51) Int. Cl.$^7$ ............................................... G03B 5/00
(52) U.S. Cl. ........................................................ 396/55
(58) Field of Search ...................... 396/55, 52; 348/208

(56) References Cited

U.S. PATENT DOCUMENTS 5,634,142 A * 5/1997 Imafuji et al. ................. 396/52
5,761,546 A   6/1998 Imada ........................... 396/55

FOREIGN PATENT DOCUMENTS

JP             410319458 A  * 12/1998  ............ G03B/5/00

* cited by examiner

Primary Examiner—W. B. Perkey
(74) Attorney, Agent, or Firm—Fitzpatrick, Cella, Harper & Scinto

(57) ABSTRACT

A vibration preventing apparatus and an image pickup apparatus such as a camera which have a vibration correction lens driven on the basis of the output of vibration detecting means for detecting the vibration of the camera and for correcting the vibration, and a plurality of resilient members for positioning the vibration correction lens at the correction center, and changes the correction center in conformity with the exposure time and/or the focal length of the camera to thereby mitigate the resonance with the frequency of the vibration.

29 Claims, 11 Drawing Sheets

IMAGE BLUR CORRECTION APPARATUS AND IMAGE PICKUP APPARATUS WITH THE IMAGE BLUR CORRECTION APPARATUS

BACKGROUND OF THE INVENTION

1. Field of the Invention

This invention relates to image blur correction means for correcting image blur attributable to vibration applied to an image pickup apparatus on the basis of the result of the detection by vibration detecting means for detecting the state of the aforementioned vibration, and an image pickup apparatus having the image blur correction means.

The invention further relates to improvements in the image blur correction apparatus of a camera and an interchangeable lens with the image blur correction apparatus.

2. Related Background Art

In present-day cameras, operations important to photographing such as exposure determination and focusing, are all automated; therefore, even a person unskilled in camera operation has very little possibility of causing a failure in photographing.

Also, recently, a system for preventing hand vibration applied to a camera has been studied and factors for inducing an error in the photographing by a photographer have become almost null.

The system for preventing hand vibration will be briefly described here.

The hand vibration of a camera during photographing is usually vibration of a frequency of 1–12 Hz, but as a basic idea for enabling a photograph free of image blur to be taken even if such hand vibration is caused at a point of time when the shutter is released, the vibration of the camera by the above-mentioned hand vibration must be detected and a correction lens must be displaced in conformity with the detected value. Accordingly, to enable a photograph free of image blur to be taken even if the vibration of the camera is caused, firstly it is necessary to detect the vibration of the camera accurately, and secondly it is necessary to correct the displacement of the optical axis caused by the hand vibration.

Theoretically speaking, the detection of this vibration (camera vibration) can be effected by carrying on a camera a vibration sensor for detecting angular acceleration, angular velocity, angular displacement, etc., and means for electrically or mechanically integrating the output signal of the vibration sensor and outputting angular displacement. Then, a correction optical system for making a photographing optical axis eccentric is driven on the basis of this detected information and the suppression of image blur is effected.

Here, the epitome of a vibration preventing system using a vibration detecting apparatus will be described with reference to FIG. 10 of the accompanying drawings.

FIG. 10 shows a system for suppressing image blur attributable to camera pitch vibration 81$p$ and to camera yaw vibration 81$y$, in the direction of arrows 81, and shows a case where an image blur correction apparatus is provided in the interchangeable lens of a single-lens reflex camera.

In FIG. 10, the reference numeral 82 designates a lens barrel, and the reference characters 89$a$, 89$b$, 89$c$ and 89$d$ denote photographing optical systems which form the image of an object, not shown, on an image plane 88. The reference characters 83$p$ and 83$y$ designate vibration detecting apparatus for detecting camera pitch vibration and camera yaw vibration, respectively, and their respective vibration detecting directions are indicated by 84$p$ and 84$y$. The reference numeral 85 denotes a correction optical system (87$p$ and 87$y$ designate coils for giving thrust to the correction optical system 85, and 86$p$ and 86$y$ denote position detecting elements for detecting the position of the correction optical system 85), and the correction optical system 85 is provided with a position control loop, and is driven with the outputs of the vibration detecting apparatuses 83$p$ and 83$y$ as target values, and secures the stability on the image plane 88.

Also, although reduced in accuracy, the detection of the position of the correction optical system 85 is abolished to thereby reduce the cost, and vibration correction is also possible by an open control technique which does not provide the position control loop, but effects vibration correction control by only a vibration amount detected.

FIG. 11 of the accompanying drawings is an exploded perspective view showing an example of an image blur correction apparatus using the open control.

In FIG. 11, the reference numeral 1 designates a support frame for holding a correction lens, the reference numeral 2 denotes a ground plate for holding the support frame 1, the reference numeral 3 designates a first yoke which is a magnetic member fixed to the ground plate 2 by screws or the like, not shown, and the reference numeral 4 denotes a winding coil fixed to the support frame 1. The reference numeral 5 designates a second yoke which is a magnetic member fixed to the ground plate 2 by screws or the like, not shown, so as to sandwich the support frame 1 between it and the first yoke 3, the reference numeral 6 denotes two permanent magnets magnetically attracted and fixed to the second yoke 5 and provided with their positions deviated by about 90° from each other. The reference characters 7$a$–7$c$ designate shift pins each having one end thereof forced into the support frame 1 and the other end thereof inserted in a slot 2$a$ formed in the ground plate 2, and radially provided about the optical axis at three locations equally divided into approximately 120° about the optical axis. The reference characters 8$a$–8$d$ denote springs for resiliently supporting the support frame 1 relative to the ground plate 2, and each of the springs 8$a$–8$d$ has one end thereof positioned by a projection 1$a$ provided on the support frame 1 and has the other end thereof positioned by a projection 2$b$ provided on the ground plate 2, and the springs 8$a$–8$d$ are provided at four locations equally divided into approximately 90° about the optical axis. The projections 1$a$ and the projections 2$a$ radially protrude about the optical axis and are provided so as to be opposed to each other on the same straight line and thus, the springs 8 (8$a$, 8$b$, 8$c$, 8$d$) are also radially disposed about the optical axis.

The assembling procedure is such that the first yoke 3 is first fixed to the ground plate 2 with screws or the like inserted into the holes thereof. Next, projections provided on the bobbin, not shown, of the winding coil 4 are inserted into holes formed in the support frame 1, and the winding coil 4 is adhesively or otherwise fixed. Then, the shift pins 7 are forced into holes formed in the support frame 1 through the slots 2$a$ formed in the ground plate 2. Thereby the support frame 1 has its movement in the direction of the optical axis regulated relative to the ground plate 2, but becomes movable except in the direction of the optical axis. Next, one end of each spring 8 is mounted on the projection 1$a$ provided on the support frame 1 and the other end is mounted on the projection 2$b$ provided on the ground plate 2. Thereby the support frame 1 is held substantially about the optical axis. Next, the permanent magnets 6 are magnetically attracted and fixed to the second yoke 5. Lastly, the second yoke 5 is fixed to the ground plate 2 by screws or the like so as to sandwich the support frame 1 between it and the first yoke 3.

The permanent magnets 6 and the winding coil 4 are disposed so as to be opposed to each other. Thereby a conventional closed magnetic circuit is formed between the first yoke 3 and the permanent magnets 6 because the second yoke 5 is a magnetic member, and the winding coil 4 provided in this closed magnetic circuit and fixed to the support frame 1 is electrically energized to thereby produce thrust and drive the support frame 1 by any stroke. Also, when the winding coil 4 is not electrically energized, the support frame 1 is held substantially at the central position by the springs 8, and since the springs 8 are provided at four locations equally divided into approximately 90°, the performance will not change even if the posture of the image blur correction apparatus changes.

The reference characters 9a and 9b designate vibration detecting sensors for detecting the vibration of an image pickup apparatus carrying the image blur correction apparatus thereon. The reference numeral 10 denotes a control circuit for effecting calculation on the basis of the outputs of the vibration detecting sensors 9a and 9b, and the control circuit 10 calculates the amount of driving of the support frame 1 (correction lens) so as to negate the vibration detected by the vibration detecting sensors 9a and 9b, and electrically energizes the winding coil 4 to thereby control the support frame 1 and secures the stability of the image plane.

In the above-described image blur correction apparatus of FIG. 11, the support frame 1 holding the correction lens is held by the springs 8 and when a shock is applied thereto, it resonates at a resonance frequency and by the spring constant of the springs 8, the resonance amplitude may become considerably great.

Also, when photographing is effected by the use of a single-lens reflex camera, mirror driving and shutter driving for the photographing operation are effected. If the shock by those drivings is applied to the aforedescribed vibration correction apparatus, the correction lens may resonate and adversely affect photographing.

The resonance amplitude attenuates with time after the shock has been applied and therefore, if the shutter time is long, the influence thereof is small, but if the shutter time becomes short, the influence thereof will become great.

Also, if the spring constant is made great, the resonance amplitude will become small, but during vibration correction, it is necessary to drive the correction lens against the springs and therefore, if the spring constant is made great, the consumed electric current will increase and thus, the spring constant cannot be made very great.

Also, depending on the camera on which the vibration correction apparatus is mounted, photographing can be accomplished without mirror driving and shutter driving being effected and therefore, it is necessary to optionally change the countermeasure for resonance in conformity with the camera on which the vibration correction apparatus is mounted.

SUMMARY OF THE INVENTION

It is a first object of the present invention to provide an image blur correction apparatus of which the central position of the blur correction is changed in conformity with the exposure time of a camera to reduce the influence of resonance attributable to the photographing operation of a correction lens held by resilient members such as springs upon the result of photographing and an image pickup apparatus having the image blur correction apparatus.

It is a second object of the present invention to provide an image blur correction apparatus of which the central position of the blur correction is changed in conformity with the focal length of a taking lens to reduce the influence of resonance attributable to the photographing operation of a correction lens held by resilient members such as springs upon the result of photographing and an image pickup apparatus having the image blur correction apparatus.

It is a third object of the present invention to provide an image blur correction apparatus of which the central position of the blur correction is changed in conformity with the exposure time of a camera or/and the focal length of a taking lens to reduce the influence of resonance attributable to the photographing operation of a correction lens held by resilient members such as springs upon the result of photographing and an image pickup apparatus having the image blur correction apparatus.

Further objects and constructions of the present invention will become apparent from the following description of some embodiments of the invention.

DESCRIPTION OF THE PREFERRED EMBODIMENTS

Figure 1:
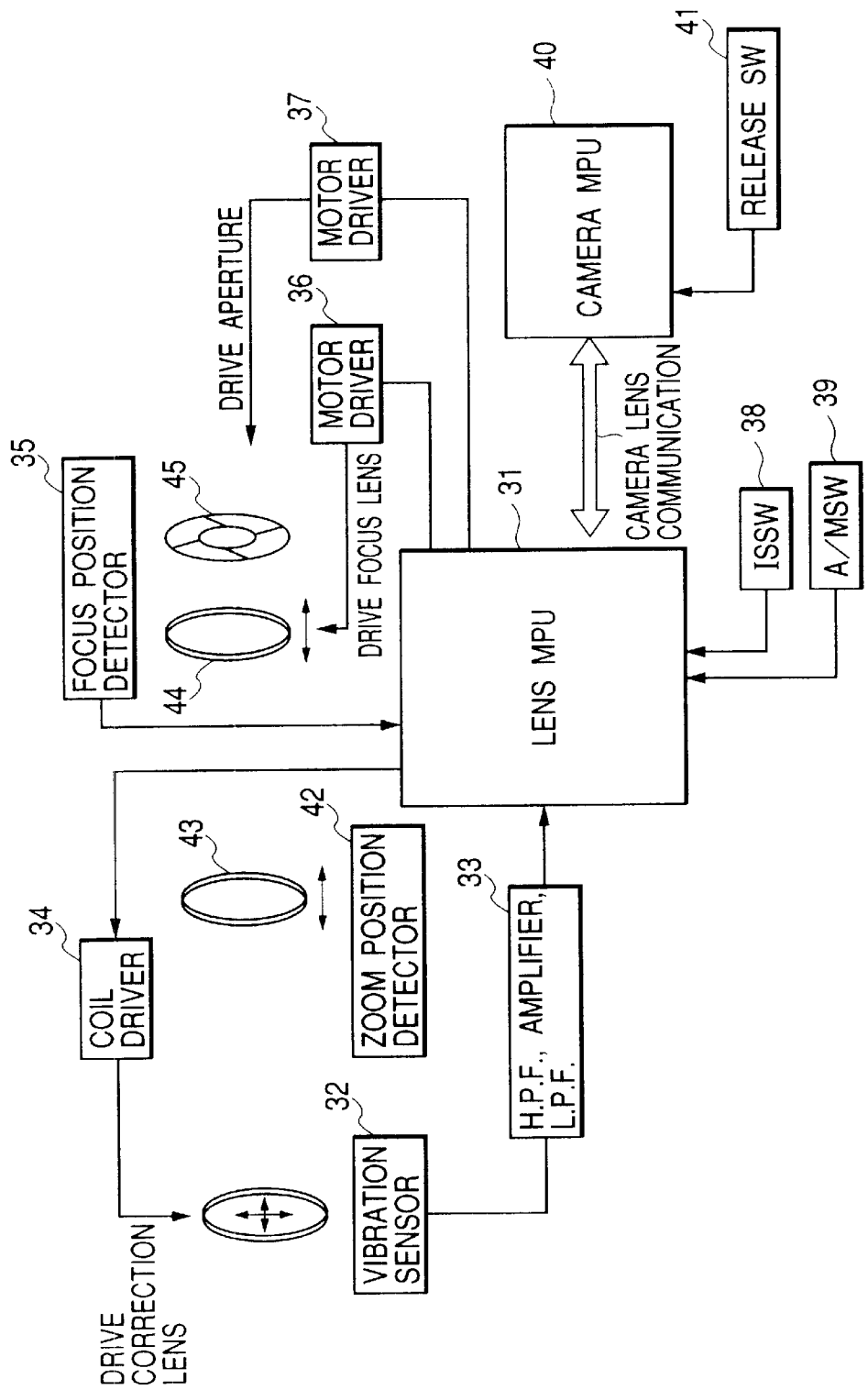
FIG. 1 is a block diagram showing the construction of an interchangeable lens for a single-lens reflex camera provided with an image blur correction apparatus according to a first embodiment of the present invention.

The present invention will hereinafter be described in detail with respect to some embodiments thereof shown in the drawings.

(First Embodiment)

Figure 11:
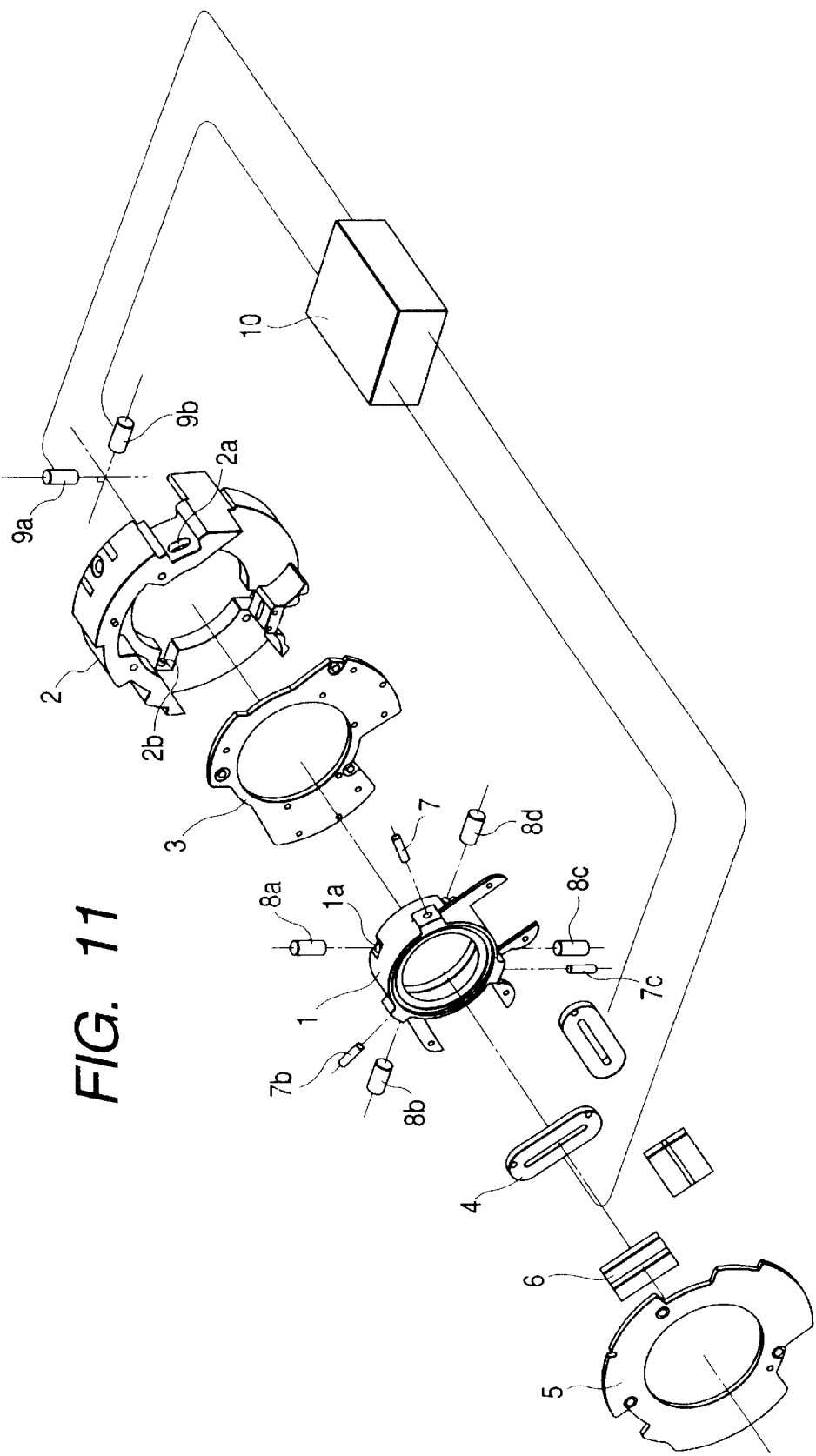
FIG. 11 is an exploded perspective view showing an example of the construction of the image blur correction apparatus of FIG. 10.

FIG. 1 is block diagram according to a first embodiment of the present invention, and in this embodiment, a case where the present invention is applied to the interchangeable lens of a single-lens reflex camera provided with an image blur correction apparatus using the open control shown in FIG. 11 is taken as an example.

In this embodiment, image blur correction supposes an example in which it is started by the ON of the switch SW1 of the camera and as will be described later, the correction center is changed by the ON of a switch SW2.

In FIG. 1, the reference numeral 31 designates a lens MPU (microcomputer) which effects the control of the lens side by the communication thereof with a camera MPU (microcomputer) 40. The reference numeral 32 denotes a vibration sensor for detecting vibration, and the output signal thereof has its DC component cut by a high-pass filter and is inputted to the A/D conversion terminal of the lens MPU 31 through a low-pass filter 33 for amplification and noise removal. The A/D-converted vibration angular velocity signal is subjected to calculations such as high pass and integration, and on the basis of the result thereof, the correction lens is driven through a coil driver 34 and image blur correction is effected.

Also, the lens MPU 31 effects, besides the image blur correction control as described above, zone detection from signals from a focus position detector 35 and a zoom position detector 42, and driving of a focus lens 44 and of an aperture 45 through motor drivers 36 and 37.

The reference numeral 38 designates a switch (ISSW) for operation selection as to whether image stabilization or image blur correction operation should be effected, and the reference numeral 39 denotes a switch (A/MSW) for selecting auto focus or manual focus.

The lens MPU 31 effects the communication with the MPU 40, and confirms the statuses (such as the focal length and the state of each switch) of the camera and lens, and transmits a command for driving a focus lens, the aperture, etc.

A release switch 41 generally is a two-stroke switch, and is designed such that by the first stroke of this release switch 41, a switch SW1, not shown, becomes ON and by the second stroke of the release switch 41, a switch SW2 for release, not shown, becomes ON.

Figure 2:
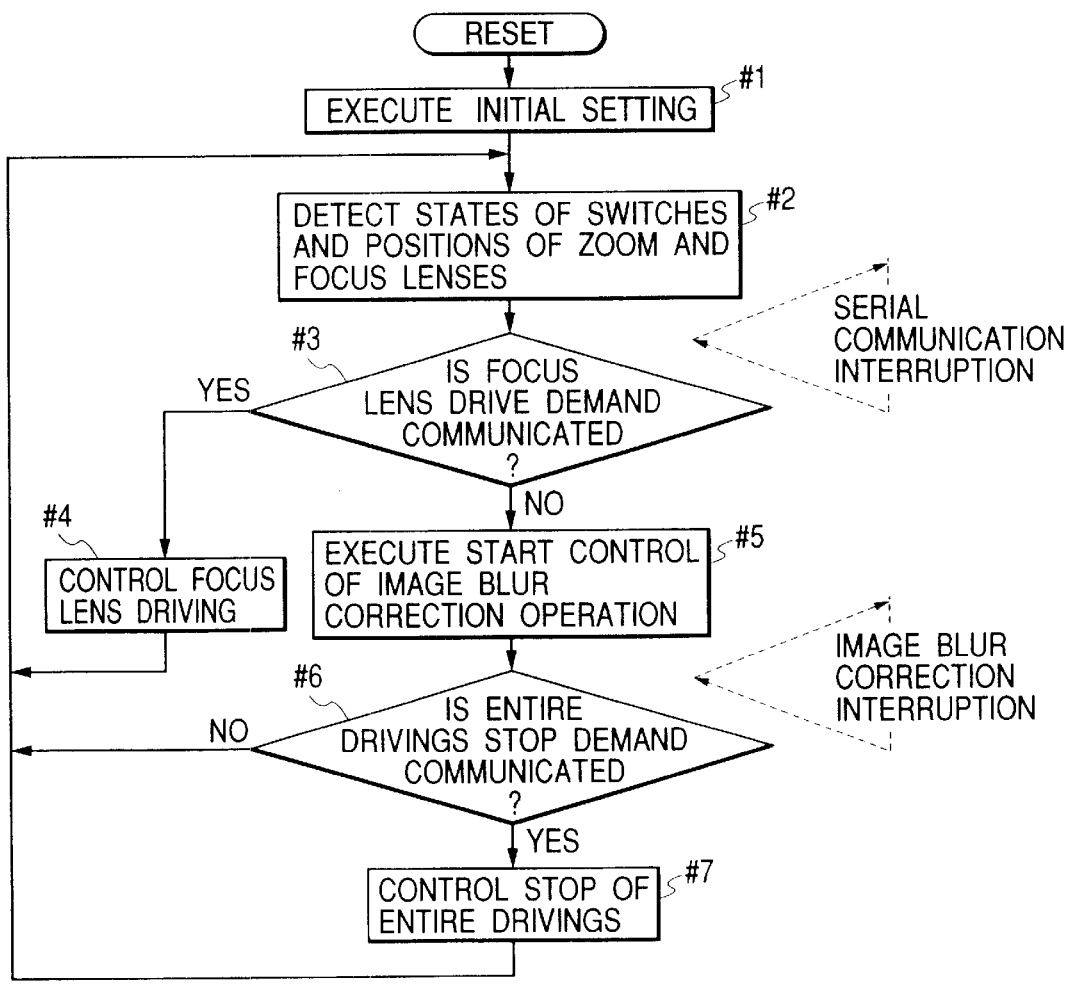
FIG. 2 is a flow chart showing the main operation in a lens MPU in the first embodiment of the present invention.

The specific operation of the lens MPU 31 will now be described with reference to the flow chart of FIG. 2.

When the lens is mounted on the camera, serial communication is done from the camera MPU 40 to the lens MPU 31, and the lens MPU 31 starts its operation from a step #1.

First, at the step #1, initial setting for lens control and image blur correction control is executed. At the next step #2, the detection of the states of the switches 38 and 39 and the detection of the positions of zoom and focus lenses are executed. At the subsequent step #3, whether a focus lens drive demand has been communicated from the camera MPU 40 is judged. If the focus lens drive demand has been communicated, shift is made to a step #4, where the amount of driving of the focus lens is commanded from the camera MPU 40 and therefore, in conformity therewith, the control of focus lens driving is executed.

Also, if there is not the focus lens drive demand, advance is made to a step #5, where the start control of the image blur correction operation such as the setting of an image blur correction start flag IS-START is executed in conformity with the communication from the camera MPU 40 and the state of the switch 38. At the next step #6, whether an entire driving stop (stop the entire driving of an actuator in the lens) demand has been communicated from the camera MPU 40 is judged. If no operation is performed on the camera side, this entire driving stop demand is communicated from the camera MPU 40 after a while and therefore, advance is made to a step #7.

At the step #7, the stop of the entire driving is controlled. Here the entire actuator driving is stopped and the lens MPU 31 assumes a sleep (stopped) state. The supply of electric power to the image blur correction apparatus is also stopped. If thereafter, some operation is performed on the camera side, the camera MPU 40 sends a communication to the lens MPU 31 and releases the sleep state.

If during these operations, there are demands for serial communication interruption and image blur correction control interruption by the communication from the camera MPU 41, those interruption processings are executed.

The serial communication interruption processing executes the decoding of communication data, and executes lens processing such as aperture driving in conformity with the result of the decoding. By the decoding of the communication data, the ON of the switch SW1 the ON of the switch SW2, the shutter time, the kind of the camera, etc. can be discriminated. Thereby, image blur correction can be started upon the ON of the switch SW1 of the camera and the changing of the central position of the correction can be done upon the ON of the switch SW2. This detailed operation will be described later.

Also, the image blur correction interruption is timer interruption occuring at each predetermined period (e.g. 500 $\mu$sec.). The control of the pitch direction (vertical direction) and the control of the yaw direction (lateral direction) are effected alternately; therefore, the sampling period in one direction in this case is 1 msec. Also, the control methods in both directions include many similar portions; therefore, the program therefor is prepared in only one system. Although the control methods (such as calculation coefficients) are the same, the results of calculation or the like are of course discrete data in the pitch direction and the yaw direction; therefore, reference addresses are set for the pitch and the yaw, respectively, the data, such as the results of the calculation, are designated by the indirect address of a RAM, and the reference addresses are changed over during pitch control and during yaw control to thereby effect calculation.

Figure 3:
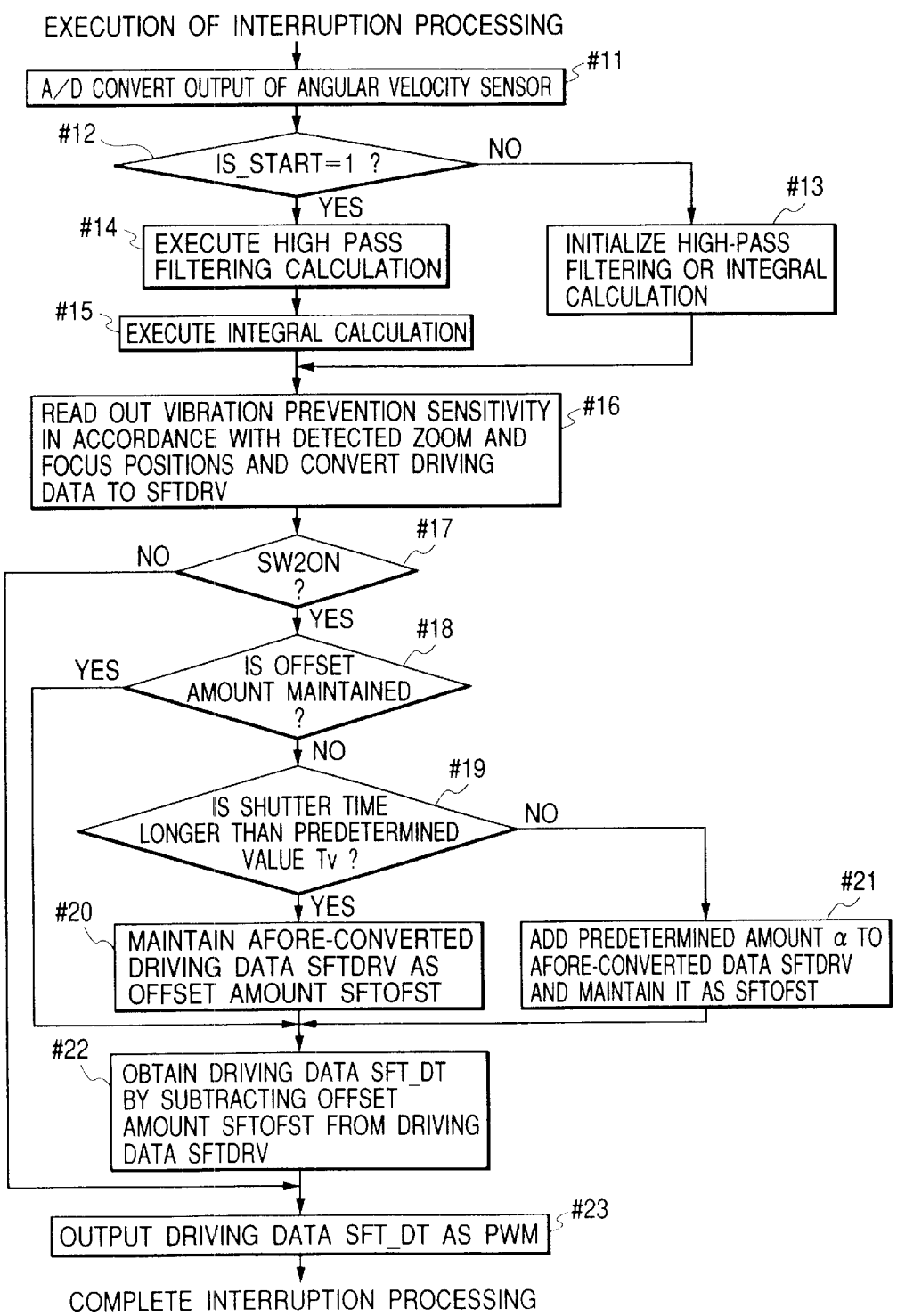
FIG. 3 is a flow chart showing the image blur correction controlling operation in the first embodiment of the present invention.

When image blur correction interruption occurs during the main operation of the camera, the lens MPU 31 starts the control of image blur correction from the step #11 of FIG. 3.

First, at the step #11, the output of, for example, an angular velocity sensor which is the vibration sensor 32 is A/D-converted. At the next step #12, the state of the image blur correction start flag IS-START is judged. If the image blur correction start flag IS-START is cleared, shift is made to a step #13, where image blur correction is not executed and therefore, high-pass filtering or integral calculation is initialized, and advance is made to a step #16.

On the other hand, if the image blur correction start flag is set, advance is made from the step #12 to a step #14, where image blur correction is performed and therefore high-pass filtering calculation is executed. For 2 to 3 seconds after the start of image blur correction, time constant changeover is effected and it is also effected to alleviate the fluctuation of the image at the rising thereof. At the next step #15, integral calculation of a set characteristic is executed. The result of this is angular displacement data $\theta$. When panning is done, it is also effected to change over the cut-off frequency of the integration in conformity with vibration angular displacement.

At the next step #16, the amount of eccentricity (sensitivity) of the correction lens to the vibration angular displacement is varied by the results of the detection from the focus position detector 35 and the zoom position detector 42, i.e., the zoom and focus positions, and therefore, the adjustment thereof is executed. Specifically, each of the zoom and focus positions is divided into several zones, and the average vibration prevention sensitivity (deg/mm) in each zone is read out from table data, and is converted into correction lens driving data SFTDRV. The result of the calculation is stored in the RAM area set in the lens MPU 31. At the next step #17, whether the switch SW2 has become ON is judged, and if this switch SW2 is not ON, advance is immediately made to a step #23.

Also, if the switch SW2 is ON, advance is made from the step #17 to a step #18, where whether the offset amount is maintained is judged. This offset amount is data for moving the correction lens to the central position when the switch SW2 has become ON. If the offset amount is maintained, shift is immediately made to a step #22. If the offset amount is not maintained, advance is made to a step #19, where whether the shutter time is longer than a predetermined value Tv is judged. If the shutter time is longer than the predetermined value Tv, advance is made to a step #20, and since the shutter time is longer than the predetermined value Tv, the influence of the spring resonance of the correction lens is small. Accordingly, in order to effect blur correction near the center, the afore-converted driving data SFTDRV is maintained as the offset amount SFTOFST. Also, if the shutter time is shorter than the predetermined value Tv, advance is made to a step #21, and since the shutter time is shorter than the predetermined value Tv, the influence of the spring resonance of the correction lens is great. Accordingly, if blur correction is effected near the center, the result of photographing will be adversely affected by the resonance; therefore, data comprising a predetermined amount α added to the afore-converted driving data SFTDRV is maintained as the offset amount SFTOFST.

At the next step #22, the final driving data SFT_DT is obtained by subtracting the offset amount SFTOFST from the afore-converted driving data SFTDRV. At the next step #23, the result of the driving data SFT_DT is outputted as PWM to the port of the lens MPU 31, and the interruption is completed. The output is inputted to the coil driver 36, and the correction lens is driven by the coil and the magnet, whereby image blur correction is effected.

As described above, at the steps #19–#21, the offset amount is changed in conformity with the shutter time of the camera. That is, at a shutter time when the resonance by mirror and shutter shocks is likely to occur, image blur correction is effected so as to urge the spring (corresponding to the spring 8 of FIG. 11) in either direction about a position deviating from the center; therefore, the resonance amplitude becomes small and the result of photographing is prevented from being adversely affected.

Also, in this first embodiment, at the step #20, the afore-converted driving amount data is maintained as the offset amount, but if zero is maintained as the offset amount, it will become equal to that the changing of the position of the correction center is not effected.

(Second Embodiment)

A second embodiment of the present invention shows an example in which a case where the operating direction of the mirror and shutter of the camera is a vertical direction (pitch direction) is supposed and only the blur correction in the pitch direction has its correction center changed in conformity with the shutter time. The circuit construction of this embodiment is similar to that of FIG. 1 and therefore need not be described.

Figure 4:
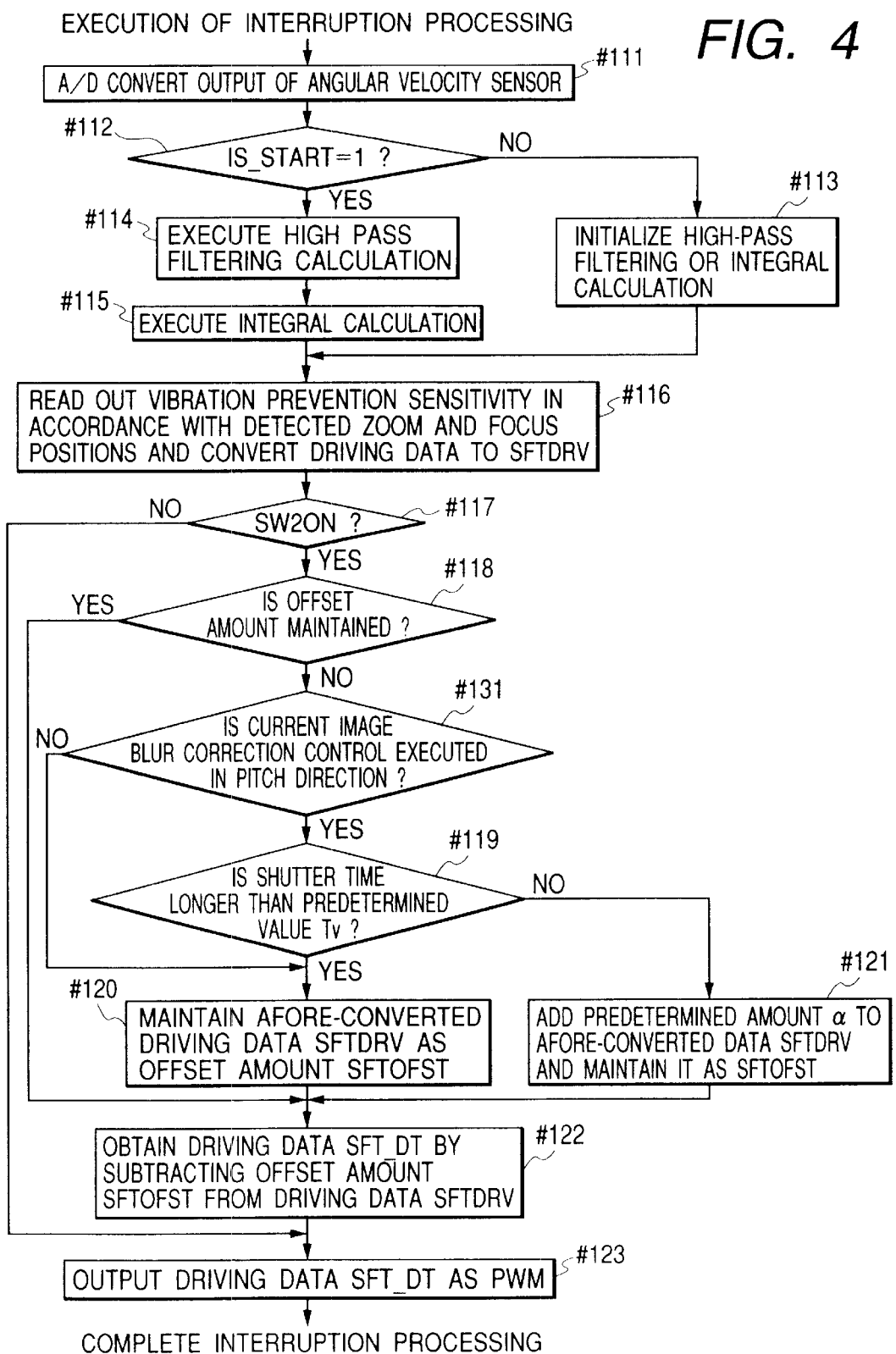
FIG. 4 is a flow chart showing the image blur correction controlling operation in a second embodiment of the present invention.

The operation of the main portion in the second embodiment of the present invention will hereinafter be described with reference to the flow chart of FIG. 4. The description of portions similar to those in the flow chart of FIG. 3, which is the first embodiment, will be omitted and only a step #131, which is an operating portion particular to the present embodiment, will be described.

At the step #131, if the current image blur correction control is in the pitch direction, advance is made to a step #119, and if the current image blur correction control is not in the pitch direction (i.e., in the yaw direction), advance is made to a step #120, and the changing of the offset amount (the changing of the correction center) in conformity with the shutter time is not executed.

As described above, if at the step #131, the image blur correction direction is the pitch, the changing of the offset amount in conformity with the shutter time is executed and therefore, the influence of the resonance in the mirror/shutter driving shock direction (pitch) of the camera can be reduced and also, with respect to the yaw direction, image blur correction can be effected at the neutral point of the spring (near the optical axis).

Also, while in this second embodiment, the case where the mirror/shutter driving direction of the camera is the pitch has been shown as an example, the correction center in the yaw direction can be controlled even when the shock direction is the yaw.

(Third Embodiment)

A third embodiment of the present invention, like the above-described first and second embodiments, shows an example in which the image blur correction apparatus in the open control as shown in FIG. 11 is applied to the interchangeable lens of a single-lens reflex camera and the changing of the correction center is or is not performed in conformity with the camera on which the interchangeable lens is mounted. The circuit construction of this embodiment is similar to that of FIG. 1 and therefore need not be described.

Figure 5:
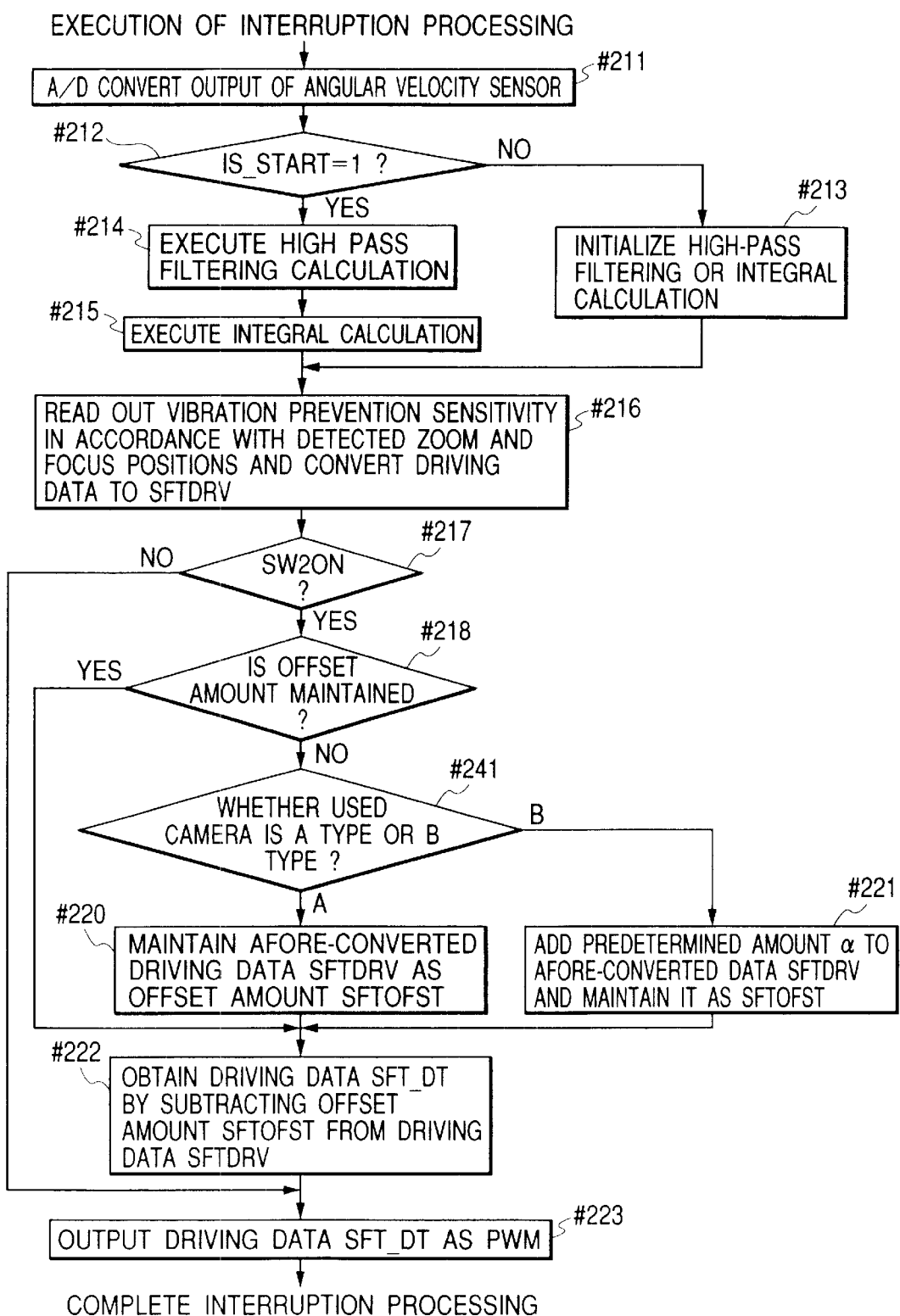
FIG. 5 is a flow chart showing the image blur correction controlling operation in a third embodiment of the present invention.

The operation of the main portion in the third embodiment of the present invention will hereinafter be described with reference to the flow chart of FIG. 5. The description of portions similar to those in the flow chart of FIG. 3, which is the above-described first embodiment, will be omitted and only a step #241, which is an operating portion particular to the present invention, will be described.

At the step #241, whether the type of the used camera is A type or B type is judged. If it is A type, advance is made to a step #220, where the changing of the offset amount (the changing of the correction center) in conformity with the shutter time is not effected. Also, if it is B type, advance is made to a step #221, where the changing of the offset amount (the changing of the correction center) is effected.

A specific example of the camera A is a camera of which the vibration during photographing is small, such as a camera in which mirror driving is not effected, a camera in which the shock of mirror driving or shutter driving is small, or a digital camera.

As described above, at the step #241, the type of the camera on which the interchangeable lens is mounted is judged, and in the case of a camera which is likely to be affected by the spring resonance of the correction lens by the shock of mirror driving or the like during photographing, the changing of the offset amount is effected and therefore, the influence of the resonance can be reduced.

Also, as regards the changing of the offset amount, the sequence of changing it in conformity with the shutter time, as in the above-described first and second embodiments, may be added with the case in conformity with the type of the camera.

Also, as will be described later, the sequence of changing the offset amount by the focal length may be added.

(Fourth Embodiment)

Figure 6:
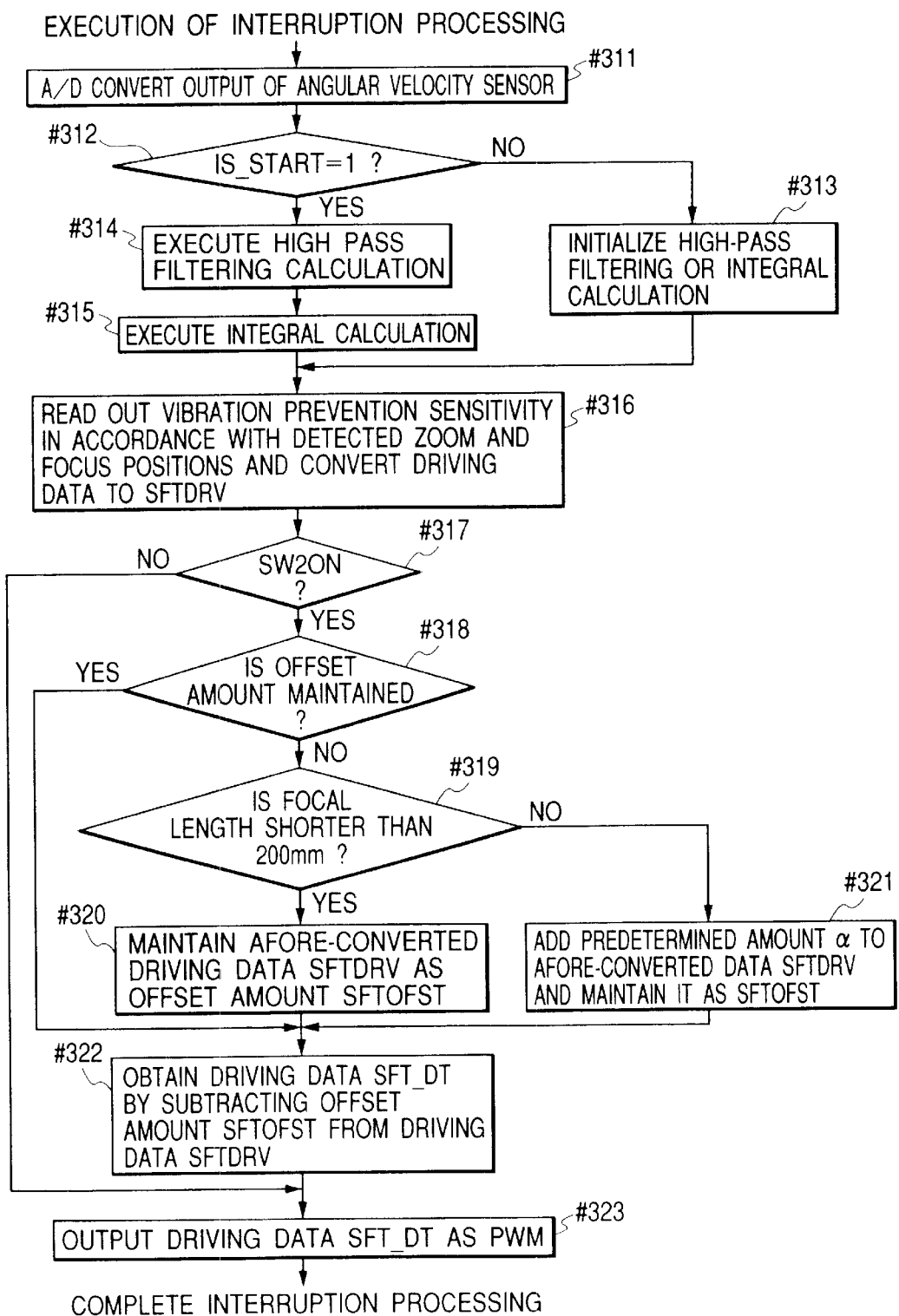
FIG. 6 is a flow chart showing the image blur correction controlling operation in a fourth embodiment of the present invention.

In this embodiment, an example in which the correction center is changed in conformity with the focal length will be described with reference to the flow chart of FIG. 6.

The construction of this embodiment is similar to that of FIG. 1 and therefore need not be described.

Steps #311–#318 are the same as the steps #11–#18 in the flow chart of FIG. 3 and therefore need not be described.

Step #319: Whether the focal length is shorter than a predetermined value 200 mm is judged. If it is shorter than 200 mm, advance is made to a step #320, and if it is longer than 200 mm, advance is made to a step #321.

Step #320: Since the focal length is shorter than the predetermined value 200 mm, the influence of the spring resonance of the correction lens is small. Accordingly, in order to effect blur correction near the center, the current driving data SFTDRV is maintained as the offset amount SFTOFST.

Step #321: Since the focal length is 200 mm or longer, the influence of the spring resonance of the correction lens is great. Accordingly, if blur correction is effected near the center, the result of photographing will be adversely affected by the resonance and therefore, data comprising a predetermined amount α added to the current driving data SFTDRV is maintained as the offset amount SFTOFST.

Step #322: The final driving data SFT_DT is obtained by subtracting the offset amount SFTOFST from the current driving data SFTDRV.

Step #323: The result of SFT_DT is outputted as PWM to the port of the microcomputer, and the interruption is completed. The output thereof is inputted to the coil driver 36, and the correction lens is driven by the coil and the magnet, whereby image blur correction is effected.

As described above, at the steps #319–#321, the offset amount is changed in conformity with the focal length, that is, at a focal length which is likely to be affected by the resonance by the mirror/shutter shock, image blur correction is effected so as to urge the spring in either direction about a position deviating from the center and therefore, the resonance amplitude becomes small and the result of photographing is prevented from being adversely affected.

Also, in the present embodiment, at the step #320, the current driving amount data is maintained as the offset amount, but if zero is maintained as the offset amount, it will become equal to that the changing of the position of the correction center is not effected.

(Fifth Embodiment)

Figure 7:
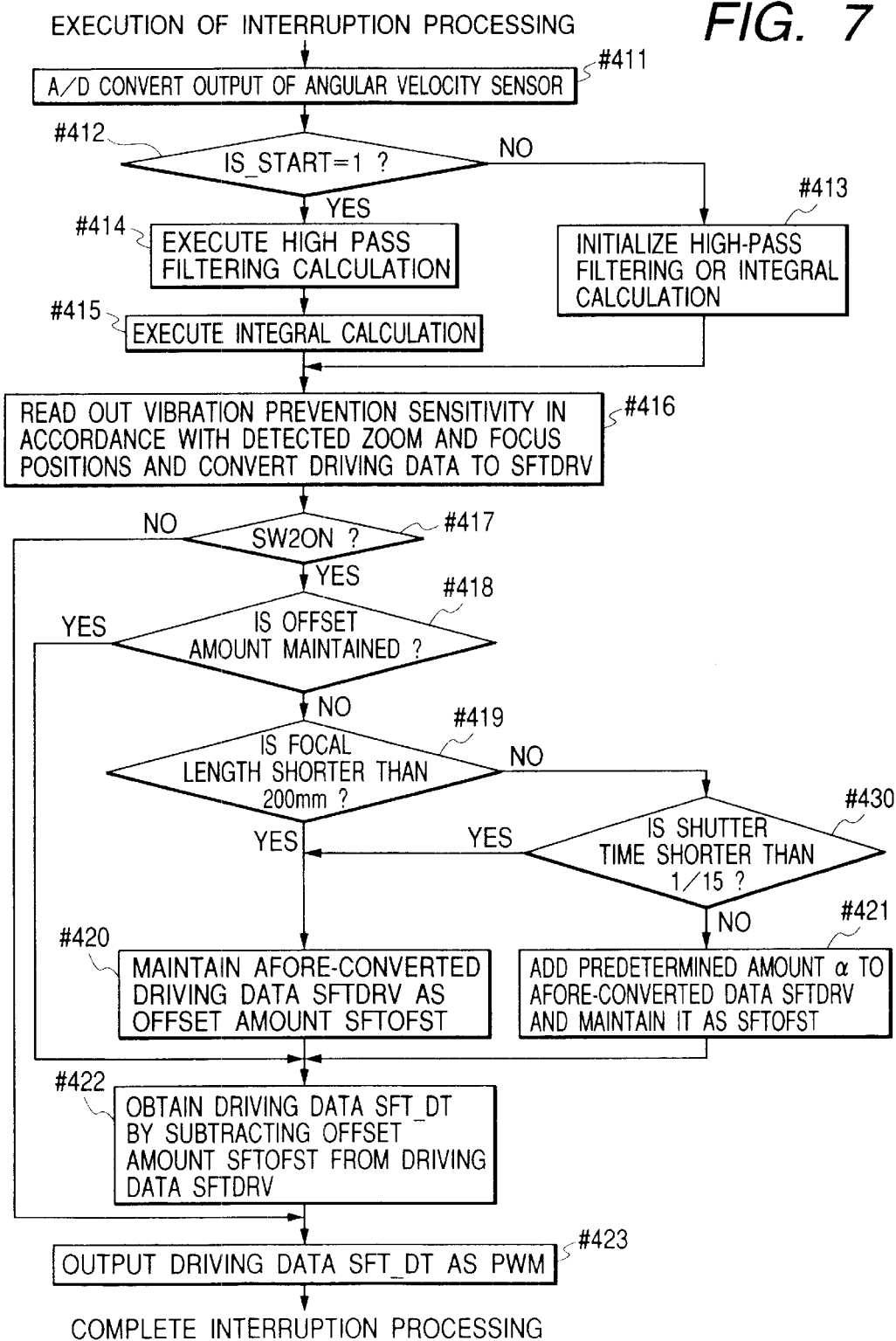
FIG. 7 is a flow chart showing the image blur correction controlling operation in a fifth embodiment of the present invention.

In this embodiment, an example in which the correction center is changed in conformity with the focal length and the shutter time will be described with reference to the flow chart of FIG. 7.

The construction of the present embodiment is similar to that of FIG. 1 and therefore need not be described.

If at a step #419, the focal length is 200 mm or longer, advance is made to a step #430.

Step #430: Whether the shutter time of the camera is longer than a predetermined value 1/15 is judged. If it is longer than 1/15, the influence of resonance becomes small and therefore advance is made to a step #420, and if it is shorter than 1/15, advance is made to a step #421 in order to mitigate the influence of resonance.

As described above, at the steps #419–#421 and the step #430, the offset amount is changed in conformity with the focal length and the shutter time, that is, if at a focal length which is likely to be affected by the resonance by the mirror/shutter shock and the shutter time is shorter than a predetermined value, image blur correction is effected so as to urge the spring in either direction about a position deviating from the center and therefore, the resonance amplitude becomes small and the result of photographing is prevented from being adversely affected.

Also, in the present embodiment, at the step #420, the current driving amount data is maintained as the offset amount, but if zero is maintained as the offset amount, it will become equal to that the changing of the position of the correction center is not effected.

(Sixth Embodiment)

Figure 8:
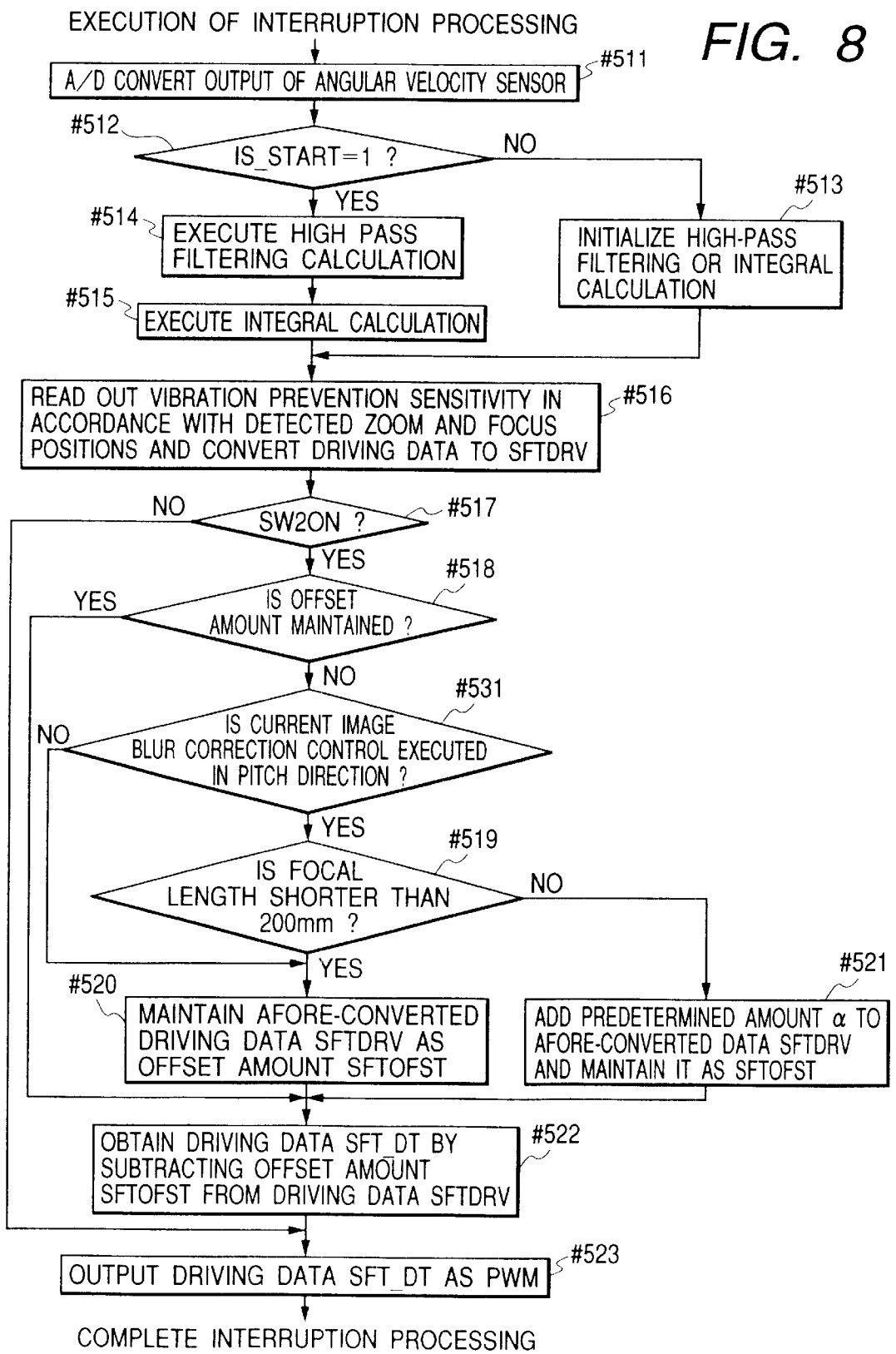
FIG. 8 is a flow chart showing the image blur correction controlling operation in a sixth embodiment of the present invention.

In this embodiment, a case where the direction of operation of the mirror and shutter of the camera is the vertical direction (pitch) is supposed, and an example in which the correction center of only the correction of the vibration in the pitch direction is changed by the focal length will be described with reference to FIG. 8.

The construction of the present embodiment is similar to that of FIG. 1 and therefore need not be described.

The description of portions similar to those in the flow chart of FIG. 7 of the fifth Embodiment will be omitted and only a step #531, which is an operation particular to the present embodiment, will be described. Step #531: If the current image blur correction control is in the pitch direction, advance is made to a step #519, and if it is not in the pitch direction (i.e., is in the yaw direction), advance is made to a step #520, and the changing of the offset amount (the changing of the correction center) in conformity with the focal length is not effected.

As described above, if at the step #531, the direction of the image blur correction is the pitch, the changing of the offset amount in conformity with the focal length is effected and therefore, the influence of the resonance in the mirror/shutter driving shock direction (pitch) of the camera can be made small and also, in the yaw direction, image blur correction can be effected at the neutral point of the spring (near the optical axis).

Also, while in the present embodiment, there has been shown an example of the case where the driving direction of the mirror and shutter of the camera is the pitch, the correction center of the yaw can be controlled even when the shock direction is the yaw.

(Seventh Embodiment)

Figure 9:
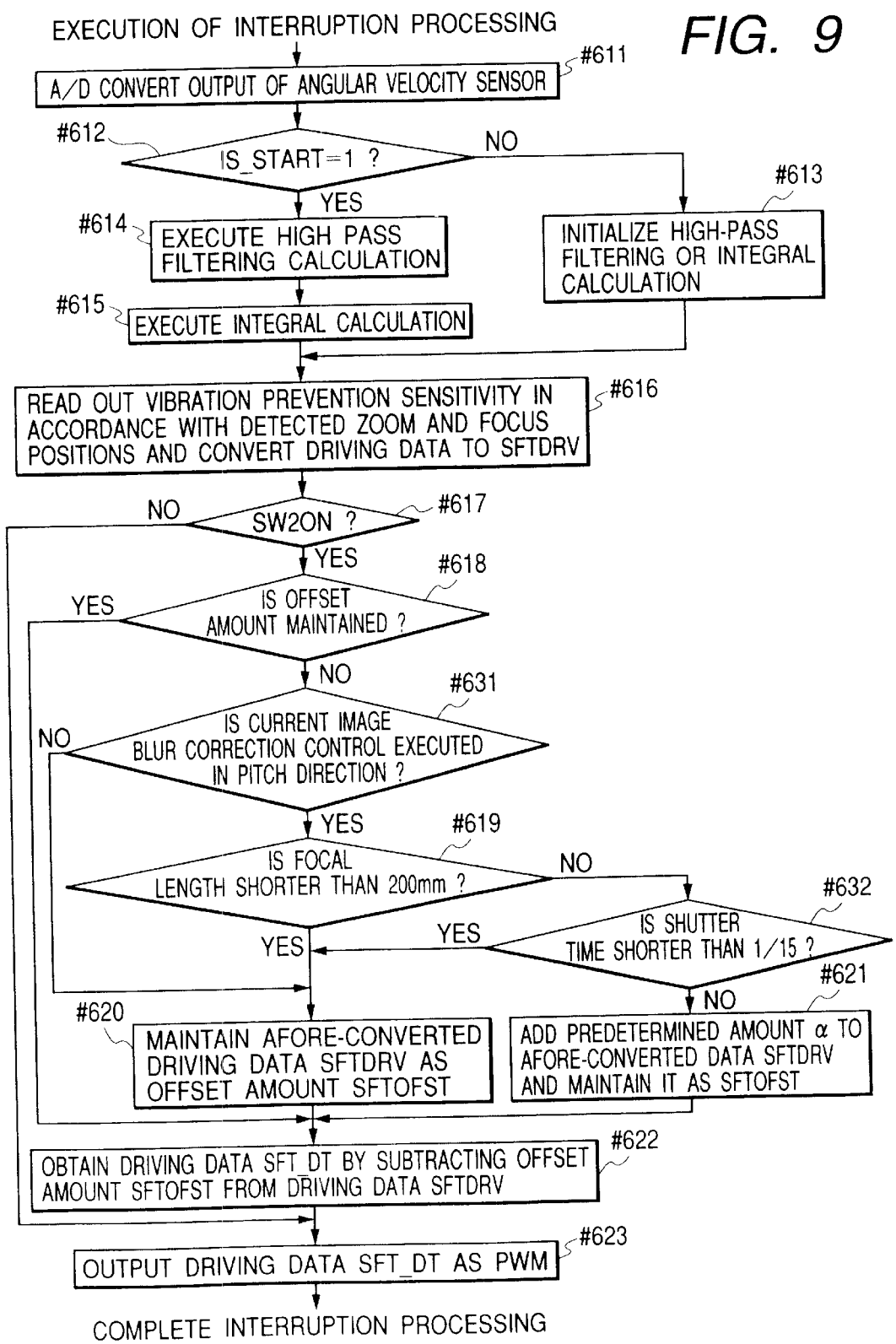
FIG. 9 is a flow chart showing the image blur correction controlling operation in a seventh embodiment of the present invention.
Figure 10:
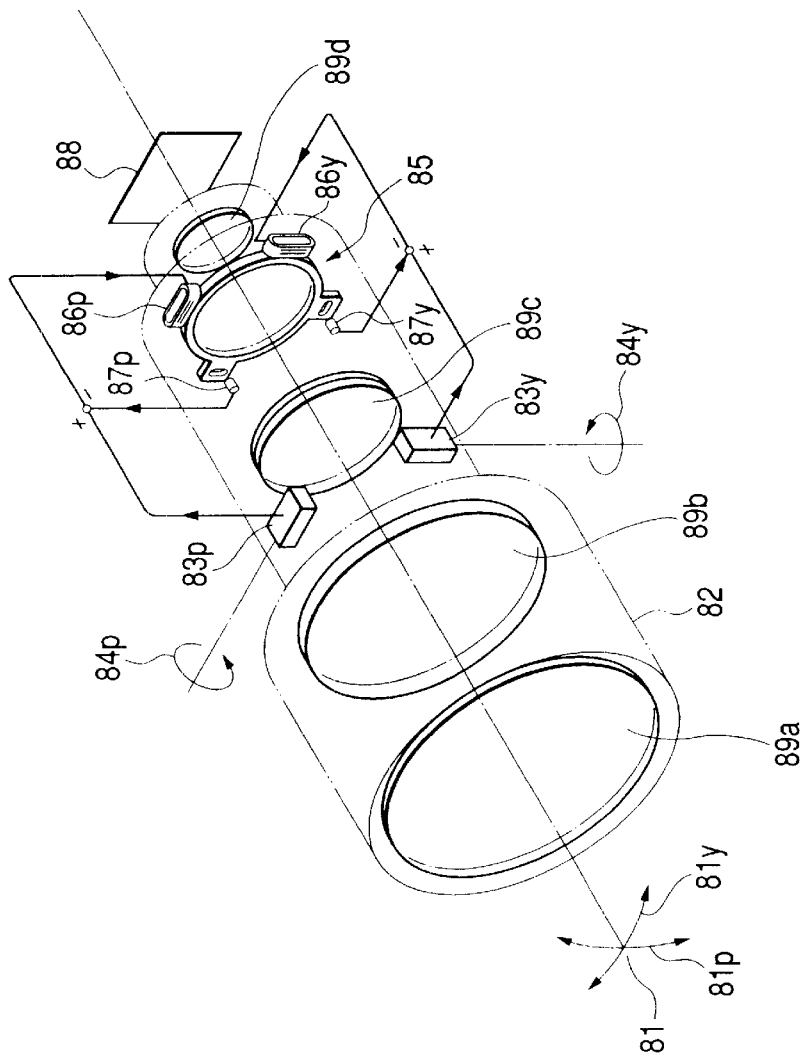
FIG. 10 is a view for illustrating the vibration preventing system of an ordinary image blur correction apparatus.

In this embodiment, a case where the direction of operation of the mirror and shutter of the camera is the vertical direction (pitch) is supposed, and an example in which the correction center of only the correction of the vibration in the pitch direction is changed in conformity with the focal length and the shutter time will be described with reference to FIG. 9.

The construction of the present embodiment is similar to that of FIG. 1 and therefore need not be described.

The description of portions similar to those in the flow chart of FIG. 8 of the sixth Embodiment will be omitted and only a step #631, which is an operation particular to the present embodiment, will be described.

If at a step #631, the control in the pitch direction is judged, and at a step #619, the focal length is 200 mm or longer, advance is made to a step #632. Step #632: Whether the shutter time of the camera is longer than a predetermined value 1/15 is judged. If it is longer than 1/15, the influence of the resonance is almost null and therefore, advance is made to a step #620, and if it is shorter than 1/15, advance is made to a step #621 to mitigate the influence of the resonance.

As described above, at the steps #619–#621 and the steps #631–#632, the offset amount is changed in conformity with the control direction, the focal length and the shutter time, that is, if in the pitch direction in which the mirror/shutter shock occurs and at a focal length which is likely to be affected by the resonance, the shutter time is longer than the predetermined value, image blur correction is effected so as to urge the spring in either direction about a position deviating from the center and therefore, the resonance amplitude becomes small and the result of photographing is prevented from being adversely affected.

Also, in the present embodiment, at the step #620, the current driving amount data is maintained as the offset amount, but if zero is maintained as the offset amount, it will become equal to that the changing of the position of the correction center is not effected.

Various parameters (such as a predetermined focal length, a predetermined shutter time and the offset amount) in the above-described embodiments may be set in a ROM in the lens MPU 31 or may be set in a non-volatile memory.

While in the above-described embodiments, the image blur correction apparatus has been shown as being incorporated in an interchangeable lens, the image blur correction apparatus may assume the form of an accessory which is not in an interchangeable lens, but is in one of conversion lenses mounted on the front of the interchangeable lens. Of course, the image blur correction apparatus may be incorporated not in an interchangeable lens, but in a fastened camera. Also, it may be incorporated in other image pickup apparatus.

Also, while in the above-described embodiments, the vibration sensor has been shown as an angular velocity sensor, it may be any one of an angular acceleration sensor, an acceleration sensor, a velocity sensor, an angular displacement sensor, a displacement sensor and a device for detecting image blur itself which can detect vibration.

As described above, according to the present invention, by adopting a construction in which the position of the correction center of the correction lens is changed in conformity with the shutter time of the camera, or in conformity with the focal length of the lens, or in conformity with the shutter time of the camera and the focal length of the lens and image blur correction control is effected so as to keep down the spring to thereby reduce the resonance of the blur correction lens attributable to the shock during the photographing operation such as mirror driving or shutter driving, the influence of the resonance upon the result of photographing can be reduced.

What is claimed is:

1. An image blur correction apparatus comprising:
   vibration detecting means for detecting vibration of an image pickup apparatus;
   correction means for correcting image blur attributable to the vibration;
   a plurality of resilient members for holding said correction means at the correction center of blur correction; and
   control means for controlling a drive of said correction means on the basis of an output of said vibration detecting means,
   wherein said control means controls so as to change the correction center in the drive of said correction means when an exposure time of the image pickup apparatus is shorter than a predetermined time.

2. An image blur correction apparatus comprising:
   vibration detecting means for detecting vibration of an image pickup apparatus;
   correction means for correcting image blur attributable to the vibration;
   a plurality of resilient members for holding said correction means at the correction center of blur correction; and
   control means for controlling a drive of said correction means on the basis of an output of said vibration detecting means,
   wherein said control means controls so as to change the amount of changing of the correction center of the drive of said correction means in conformity with an exposure time of the image pickup apparatus.

3. An image blur correction apparatus according to claim 1 or 2, wherein said correction means is movable in a first direction and a second direction differing from the first direction, and said control means controls the drive of said correction means so as to effect the changing of the center of blur correction only in the first direction.

4. An image blur correction apparatus according to claim 1 or 2, wherein said image pickup apparatus is a camera capable of interchanging the lens thereof.

5. An image blur correction apparatus according to claim 1 or 2, wherein said control means is a microcomputer.

6. A lens barrel having the image blur correction apparatus of claim 1 or 2.

7. An image pickup apparatus having an image blur correction apparatus, comprising:
   an image pickup optical system;
   vibration detecting means for detecting vibration of said image pickup apparatus;
   correction means having in said image pickup optical system an optical system for correcting image blur attributable to the vibration;
   a resilient member for holding said correction means at the correction center of blur correction; and
   control means for controlling a drive of said correction means on the basis of an output of said vibration detecting means,
   wherein said control means controls so as to change the correction center of the drive of said correction means when an exposure time of said image pickup apparatus is shorter than a predetermined time.

8. An image pickup apparatus having an image blur correction apparatus, comprising:
   an image pickup optical system;
   vibration detecting means for detecting vibration of said image pickup apparatus;
   correction means having in said image pickup optical system an optical system for correcting image blur attributable to the vibration;
   a resilient member for holding said correction means at the correction center of blur correction; and
   control means for controlling a drive of said correction means on the basis of an output of said vibration detecting means,
   wherein said control means controls so as to change the amount of changing of the correction center of the drive of said correction means in conformity with an exposure time of said image pickup apparatus.

9. An image pickup apparatus according to claim 7 or 8, wherein said correction means is movable in a first direction and a second direction differing from the first direction, and said control means drive-controls said correction means so as to effect the changing of the center of blur correction only in said first direction.

10. An image pickup apparatus according to claim 7 or 8, which is a camera system capable of interchanging the lens thereof.

11. An image pickup apparatus according to claim 7 or 8, wherein said control means is a microcomputer.

12. An image blur correction apparatus comprising:

vibration detecting means for detecting vibration of an image pickup apparatus;

correction means for correcting image blur attributable to the vibration;

a plurality of resilient members for holding said correction means at the correction center of blur correction; and control means for controlling a drive of said correction means on the basis of an output of said vibration detecting means, wherein said control means controls so as to change the correction center of the drive of said correction means when a focal length of an image pickup optical system of the image pickup apparatus is greater than or equal to a predetermined value.

13. An image blur correction apparatus comprising:

vibration detecting means for detecting vibration of an image pickup apparatus;

correction means for correcting image blur attributable to the vibration;

a plurality of resilient members for holding said correction means at the correction center of blur correction; and control means for controlling a drive of said correction means on the basis of an output of said vibration detecting means, wherein said control means controls so as to change the amount of changing of the drive of the correction center of said correction means correspondingly to a focal length of an image pickup optical system of the image pickup apparatus.

14. An image blur correction apparatus according to claim 12 or 13, wherein said correction means is movable in a first direction and a second direction differing from the first direction, and said control means drive-controls said vibration correcting means so as to effect the changing of the center of the blur correction only in said first direction.

15. An image blur correction apparatus according to claim 12 or 13, wherein said image pickup apparatus is a camera system capable of interchanging the lens thereof.

16. An image blur correction apparatus according to claim 12 or 13, wherein said control means is a microcomputer.

17. An image pickup apparatus having an image blur correction apparatus, comprising:

an image pickup optical system;

vibration detecting means for detecting vibration of said image pickup apparatus;

correction means having in said image pickup optical system an optical system for correcting image blur attributable to the vibration;

a resilient member for holding said correction means at the correction center of blur correction; and control means for controlling a drive of said correction means on the basis of an output of said vibration detecting means, wherein said control means drive-controls so as to change the correction center of said correction means when a focal length of said image pickup optical system is greater than or equal to a predetermined value.

18. An image pickup apparatus having an image blur correction apparatus, comprising:

an image pickup optical system;

vibration detecting means for detecting vibration of said image pickup apparatus;

correction means having in said image pickup optical system an optical system for correcting image blur attributable to the vibration;

a resilient member for holding said correction means at the correction center of blur correction; and control means for controlling a drive of said correction means on the basis of an output of said vibration detecting means, wherein said control means controls so as to change the amount of changing of the drive of the correction center of said correction means correspondingly to a focal length of said image pickup optical system of said image pickup apparatus.

19. An image pickup apparatus according to claim 17 or 18, wherein said correction means is movable in a first direction and a second direction differing from the first direction, and said control means drive-controls said correction means so as to effect the changing of the center of the blur correction only in said first direction.

20. An image pickup apparatus according to claim 17 or 18, which is a camera system capable of interchanging the lens thereof.

21. An image pickup apparatus according to claim 17 or 18, wherein said control means is a microcomputer.

22. An image blur correction apparatus comprising:

vibration detecting means for detecting vibration of an image pickup apparatus;

correction means for correcting image blur attributable to the vibration;

a plurality of resilient members for holding said correction means at the correction center of blur correction; and control means for controlling a drive of said correction means on the basis of an output of said vibration detecting means, wherein said control means controls so as to change the correction center of the drive of said correction means in conformity with an exposure time of the image pickup apparatus and a focal length of an image pickup optical system of the image pickup apparatus.

23. An image blur correction apparatus comprising:

vibration detecting means for detecting vibration of an image pickup apparatus;

correction means for correcting image blur attributable to the vibration;

a plurality of resilient members for holding said correction means at the correction center of blur correction; and control means for controlling a drive of said correction means on the basis of an output of said vibration correcting means, wherein said control means controls so as to change the amount of changing of the correction center of the drive of said correction means correspondingly to an exposure time of the image pickup apparatus and a focal length of an image pickup optical system of the image pickup apparatus.

24. An image pickup apparatus having an image blur correction apparatus, comprising:

an image pickup optical system;

vibration detecting means for detecting vibration of said image pickup apparatus;

correction means having in said image pickup optical system an optical system for correcting image blur attributable to the vibration;

a resilient member for holding said correction means at the correction center of blur correction; and control means for controlling a drive of said correction means on the basis of an output of said vibration detecting means, wherein said control means controls so as to change the amount of changing of the correction center of the drive of said correction means corresponding to an exposure time of said image pickup apparatus and a focal length of said image pickup optical system of said image pickup apparatus.

25. An image pickup apparatus having an image blur correction apparatus, comprising:

an image pickup optical system;

vibration detecting means for detecting vibration of said image pickup apparatus;

correction means having in said image pickup optical system an optical system for correcting image blur attributable to the vibration;

a resilient member for holding said correction means at the correction center of blur correction; and control means for controlling a drive of said correction means on the basis of an output of said vibration detecting means, wherein said control means controls so as to change the amount of changing of the correction center of the drive of said correction means correspondingly to an exposure time of said image pickup apparatus and a focal length of said image pickup optical system of said image pickup apparatus.

26. An interchangeable lens having an image blur correction apparatus, comprising:

an image pickup optical system;

discriminating means for discriminating the kind of an image pickup apparatus on which said interchangeable lens is mounted;

vibration detecting means for detecting vibration of said image pickup apparatus;

correction means having in said image pickup optical system an optical system for correcting image blur attributable to the vibration;

a resilient member for holding said correction means at the correction center of blur correction; and control means for controlling a drive of said correction means on the basis of an output of said vibration detecting means, wherein said control means controls so as to change the correction center of the drive of said correction means in conformity with the result of the discrimination by said discriminating means.

27. An interchangeable lens having an image blur correction apparatus, comprising:

an image pickup optical system;

discriminating means for discriminating the kind of an image pickup apparatus on which said interchangeable lens is mounted;

vibration detecting means for detecting vibration of said image pickup apparatus;

correction means having an optical system forming a portion of said image pickup optical system for correcting image blur attributable to the vibration;

a resilient member for holding said correction means at the correction center of blur correction; and control means for controlling a drive of said correction means on the basis of an output of said vibration detecting means, wherein said control means controls so as to change the amount of changing of the correction center of the drive of said correction means in conformity with the result of the discrimination by said discriminating means.

28. An interchangeable lens according to claim 26 or 27, wherein said control means further controls so as to change the correction center of the drive of said correction means in conformity with an exposure time of the image pickup apparatus or a focal length of said interchangeable lens.

29. An interchangeable lens according to claim 26 or 27, wherein said control means further controls so as to change the amount of changing of the correction center of the drive of said correction means in conformity with an exposure time of the image pickup apparatus or a focal length of said interchangeable lens.

* * * * *

UNITED STATES PATENT AND TRADEMARK OFFICE
CERTIFICATE OF CORRECTION

PATENT NO. : 6,470,147 B2 Page 1 of 1
DATED : October 22, 2002
INVENTOR(S) : Shinji Imada It is certified that error appears in the above-identified patent and that said Letters Patent is hereby corrected as shown below:

Column 6,
Line 26, "(e.g." should read -- (e.g., --.

Signed and Sealed this

Eighth Day of April, 2003

JAMES E. ROGAN
*Director of the United States Patent and Trademark Office*